United States Patent

[11] 3,616,186

[72] Inventor Jennings P. Blackwell
Bartlesville, Okla.
[21] Appl. No. 861,994
[22] Filed Sept. 29, 1969
[45] Patented Oct. 26, 1971
[73] Assignee Phillips Petroleum Company

[54] COPPER-POLY (ARYLENE SULFIDE) LAMINATES AND PROCESS FOR PREPARING SAME
9 Claims, No Drawings

[52] U.S. Cl. .................................................... 161/187, 117/49, 117/127, 117/128.4, 117/132 C, 156/308, 161/187, 161/188, 161/213, 161/225
[51] Int. Cl. .................................................... B32b 15/20, B32b 15/08
[50] Field of Search .......................................... 161/187, 188, 213, 225; 117/127, 128.4, 132 C, 49; 156/308

[56] References Cited
UNITED STATES PATENTS

| | | | |
|---|---|---|---|
| 3,527,665 | 9/1970 | Wright et al. | 161/213 X |
| 3,119,782 | 1/1964 | Fram | 11/132 X |
| 3,317,487 | 5/1967 | Smith | 161/213 X |
| 3,388,945 | 6/1968 | Kevelin et al. | 161/187 X |
| 3,395,132 | 7/1968 | Smith | 161/187 X |

*Primary Examiner*—Harold Ansher
*Attorney*—Young and Quigg

ABSTRACT: Laminate structures of a poly(arylene sulfide) coating composition on a copper substrate are formed by pretreating the copper substrate with a basic nitrogenous compound or salt thereof prior to the coating of the substrate with the poly(arylene sulfide) coating composition.

COPPER-POLY (ARYLENE SULFIDE) LAMINATES AND PROCESS FOR PREPARING SAME

BACKGROUND OF THE INVENTION

This invention relates to laminate structures of copper and poly(arylene sulfide) resins. In one specific aspect this invention relates to a novel process for treating a substrate of copper so as to achieve bonding of a poly(arylene sulfide) resin thereto.

Poly(arylene sulfides) such as poly(phenylene sulfide) are well known in the art for their high temperature stability. While it is generally regarded in the art that these polymers can be bonded to metallic substrates, poly(arylene sulfide) coated articles have not yet achieved significant commercial success. While it has been found that poly(arylene sulfides) do adhere to some metal substrates as broadly alleged in the prior art, copper metal generally forms a weak bond of inconsistent strength to the poly(arylene sulfide). Efforts to improve the bond to copper by conventional cleaning treatments, such as degreasing with a solvent or cleaning with acid, have been unsuccessful, indicating that the problem is of a more fundamental nature than simple interference with the bond by impurities on the surface of the metal.

It is an object of the present invention to provide a novel laminate structure of copper and a normally solid poly(arylene sulfide) resin.

Another object of this invention is to provide a process for consistently obtaining good adhesion of a poly(arylene sulfide) resin to a copper metal substrate.

Other aspects, objects and the several advantages of the invention will become apparent from a reading of the disclosure and the appended claims.

THE INVENTION

In accordance with this invention, I have discovered that laminate structures comprising a copper substrate and a normally solid poly(arylene sulfide) resin consistently bonded securely thereto is formed by pretreating the copper substrate with a basic nitrogenous compound or salt thereof prior to coating thereof with the normally solid poly(arylene sulfide) resin.

The term "normally solid poly(arylene sulfide) resins" as used herein is intended to include those normally solid aromatic sulfide resins such as poly(p-phenylene sulfide) produced by the reaction of polyhalo-substituted aromatic compounds with alkali metal sulfides in the presence of a polar solvent such as N-metyl-2-pyrrolidone, as disclosed in Edmonds et al., U.S. Pat. No. 3,354,129. Any normally solid poly(arylene sulfide) can be used in the practice of this invention. The presently preferred polymer is poly(phenylene sulfide). The term poly(arylene sulfide) is further meant to include not only homopolymers but also normally solid arylene sulfide copolymers, terpolymers and the like. Poly(arylene sulfides) of this invention preferably will have an inherent viscosity in chloronaphthalene at 206° C. of at least 0.1, more preferably between 0.1 and 0.3. If desired, the poly(arylene sulfide) can be lightly cured or crosslinked, e.g. by heating moderately, prior to application to the copper substrate.

Suitable basic nitrogenous compounds and salts thereof which are useful as treating agents in accordance with the invention are those selected from the group consisting of ammonia, ammonium hydroxide, ammonium chloride, hydrazine, hydrazine dihydrochloride, hydroxylamine hydrochloride, tetramethylammonium chloride, diethylamine hydrochloride, cupric ammonium chloride, and 1H-benzotriazole.

Although the basic nitrogenous compound or salt thereof can be applied to the substrate without dilution, particularly if liquid at the temperature of application or use, it preferably is employed as a solution, suspension or paste in a liquid in which the compound exhibits substantial solubility. Thus, the compound can be applied in conjunction with common liquid carriers such as water, acetone, alcohol, ether and the like, depending in part on the nitrogenous compound used as well as economic factors. When a solution of these agents is employed, it is preferable to utilize a concentration of at least 10 percent by weight up to a saturated solution. However, concentrations outside this range can be employed.

The copper metal substrate as used in the present invention can be in any shape desired. Thus, copper sheeting, wire, coupons, blanks and the like are suitable for formation of the laminates of the invention.

Since the resulting laminates of this invention can be further shaped following the formation of same by the process of this invention, it is not essential that the initial copper metal substrate be in the form ultimately desired for use thereof.

The initial conditioning or treatment of the copper metal substrate is achieved by the contacting of the metal with the basic nitrogenous treating agent for a period of about 1 minute to 4 hours, preferably 5 to 30 minutes. The contacting of the copper is conveniently achieved by immersion of the copper metal substrate into the treating agent. However, any means which assures uniform contact of the metal and treating agent can be employed in carrying out the process of the invention. The treating agents are generally utilized at room temperature, although heating of same can be employed if desired. The particular temperature of the treating agent is not critical to the carrying out of the invention.

Coating of the treated copper substrate with the normally solid poly(arylene sulfide) resin is accomplished by any convenient means known to the art. For example, a slurry of polymer and water or other liquid suspending agent, e.g. ethylene glycol, methyl alcohol or toluene, can be employed. Also, fluidized bed techniques, evaporation of a solvent from a solution of the polymer, and spraying a stream of the polymer entrained in a gas such as air against the copper surface to be coated, while the surface is at a temperature above the melting or softening point of the polymer, can be employed.

Following coating of the substrate, the resulting laminate is thereafter heated to cure the resin coating. During this step the solvent if present is first evaporated off, the polymer melts and fuses together into a continuous coating and is cured. Preferably, the curing, i.e. cross-linking, is done in air at a temperature of 550° to 800° F., preferably 625° to 750° F., for a time within the range of 1 minute to 5 hours, preferably 15 minutes to 2 hours.

Although not essential to the obtaining of a laminate structure in accordance with the present invention, in one embodiment thereof the normally solid poly(arylene sulfide) coating composition can contain about 0.5 to about 50 weight percent based on the total weight of the composition of an oxide or sulfide of cobalt or molybdenum or an oxide of titanium.

The addition of these additives serves to further assist in the forming of a leveled coating without pinholes which is securely bonded to the copper substrate.

In addition to the polymer and oxide or sulfide of cobalt or molybdenum or oxide of titanium as above indicated, other materials can be incorporated into the coating composition, such as surfactants, gums, fillers, pigments and similar coloring agents and the like.

Where thicker coatings are desired, the application of polymer to the surface and subsequent heat treatment can be repeated one or more times.

The resulting laminate can be sanded or otherwise abraded prior to or after curing if desired to impart a smooth surface to the ultimate laminate structure.

Laminate structures of this invention can be employed for a variety of purposes. Such laminates are particularly important in applications where high-temperature resistance is desired. Especially useful is the application of such laminate structures in the form of coated wire designed to carry electrical current in sufficiently large amounts that the conducting wire becomes hot, thus subjecting the insulation around the wire to high temperatures.

The following examples are presented to further illustrate the invention:

EXAMPLE I

A series of copper coupons following cleaning with steel wool and soap were treated with the agent shown in the table below by immersion of the coupon therein for a period of 10 minutes. Following the treatment the copper metal was wiped dry and then coated with an aqueous slurry consisting of 75 parts by weight poly(p-phenylene sulfide), 25 parts $TiO_2$ and 100 parts $H_2O$ containing 1 weight percent surface-active agent (Triton x-100). After evaporation of water from the coated surface, the coupons were baked in air for 30 minutes at 625° to 700° F., resulting in a cured coating of about 1 mil in thickness.

The following results were obtained based on visual observation of the sample:

| Sample | Treating agent | Bending test [a] | Reverse impact test [b] |
|---|---|---|---|
| 1 | None | No adhesion | No adhesion. |
| 2 | $NH_4Cl/H_2O$ paste | No cracks | No cracks. |
| 3 | $NH_4Cl/H_2O$ saturated solution. | do | Do. |
| 4 | $NH_4Cl/H_2O$ 10% solution | do | Do. |
| 5 | $NH_4Cl$—10% solution in $H_2O$ containing 1% Triton X-100. | do | Do. |
| 6 | $NH_4Cl$—10% solution in $H_2O$ containing 0.5% high molecular weight nonionic polyacrylamide gum (Polyhall 402). | do | Do. |

[a] Bending Test.—The coupon is bent to a 90° angle, and the resulting cured surface is examined for cracks.

[b] Gardner Laboratories Reverse Impact Test.—The equipment used comprises a rounded tip which rests above the sample on the reverse side from the coating. A 4-pound ram is raised 40 inches and dropped against the tip which then impinges on the back side of the coated coupon. The side opposite that which comes in contact with the tip, that is, the side having the coating, is examined for cracks and looseness of the coating.

EXAMPLE II

Tests were carried out by the procedure of example I except that the coating formulation consisted of 66 parts by weight poly(p-phenylene sulfide), 44 parts $TiO_2$ and 100 parts $H_2O$ containing 1 weight percent Triton X-100*. The following results were obtained:

| Sample | Treating agent | Bending test | Reverse impact test |
|---|---|---|---|
| 7 | $NH_4Cl/H_2O$ paste | No cracks | No cracks. |

*Condensation product of t-octylphenol and ethylene oxide having an average of 9 to 10 ethyleneoxy units per molecule.

EXAMPLE III

Tests were conducted by the procedure of example I except that the coating formulation consisted of 110 parts by weight poly(p-phenylene sulfide) and 125 parts $H_2O$ containing 1 weight percent Triton X-100. The following results were obtained:

| Sample | Treating agent | Bending test | Reverse impact test |
|---|---|---|---|
| 8 | $NH_4Cl/H_2O$ paste | No cracks | No cracks. |
| 9 | $NH_4Cl$—10% solution in $H_2O$. | do | Do. |

EXAMPLE IV

Tests were carried out by the procedure of example I except that copper wire was used instead of copper coupons. The following results were obtained:

| Sample | Treating agent | Bending test |
|---|---|---|
| 10 | $NH_4Cl/H_2O$ paste | No cracks. |
| 11 | $NH_4Cl$—10% solution in $H_2O$, 0.5% Polyhall 402 gum. | Do. |
| 12 | $NH_4Cl$—10% solution in $H_2O$ | Do.[a] |

[a] Bent wires further treated at 300° F. for 336 hours without development of cracks.

EXAMPLE V

Bending tests were conducted on a series of copper coupons coated with the formulation described in example I and employing the same procedure as in example I except that different treating agents were used prior to application of the coating formulation. The following results were obtained:

| Sample | Treating agent | Bending test |
|---|---|---|
| 13 | $NH_4OH$ concentrated | No cracks. |
| 14 | Hydrazine dihydrochloride, 10% $H_2O$ solution. | Do. |
| 15 | Hydroxylamine hydrochloride/$H_2O$ paste | Do. |
| 16 | Cupric ammonium chloride, 20% $H_2O$ solution. | Do. |
| 17 | Tetramethylammonium chloride/$H_2O$ paste | Do. |
| 18 | Diethylamine hydrochloride/$H_2O$ paste | Do. |
| 19 | 1H-benzotriazole, 1% solution in acetone | Do. |

EXAMPLE VI

A series of copper coupons were coated with the formulation described in example I by use of the procedure described in example I. In some instances after the first coating was baked, the coating formulation was again applied and baked, resulting in two cured coats having a total thickness of about 2 mils. The highest reverse impact that the coupons could withstand without cracking of the coating was then determined with the reverse impact tester described in example I by varying the height from which the ram was dropped. The following results were obtained:

| Sample | Treating agent | Highest reverse impact without cracking of the coating, in.-lb. | |
|---|---|---|---|
| | | Single coat, average | Two coats |
| 20 | None | 110 | 12 |
| 21 | $NH_4Cl$—10% solution in $H_2O$ | 160 | 60 |
| 22 | 1H-benzotriazole—1% solution in acetone. | 140 | 120 |

Reasonable variations and modifications are possible within the spirit and scope of the invention, the essence of which is that a laminate structure of copper and a normally solid poly(arylene sulfide) resin is achieved by pretreating the copper substrate with a basic nitrogenous compound or salt thereof prior to application of the polymeric coating.

I claim:

1. A process for forming a laminate structure of copper and a normally solid poly(arylene sulfide) resin which comprises (A) treating at least one surface of a copper substrate with a treating agent selected from the group consisting of ammonia, ammonium hydroxide, ammonium chloride, hydrazine, hydrazine dihydrochloride, hydroxylamine hydrochloride, tetramethylammonium chloride, diethylamine hydrochloride, cupric ammonium chloride and 1H-benzotriazole, (B) coating the resulting treated surface of said copper substrate with a normally solid poly(arylene sulfide) resin coating composition and thereafter (C) curing the resulting poly(arylene sulfide) resin coating copper laminate whereby there is formed a cured poly(arylene sulfide) resin coated copper laminate.

2. A process according to claim 1 wherein said coating composition consists essentially of a normally solid poly(p-phenylene sulfide) resin.

3. A process according to claim 1 wherein said treating agent is ammonium chloride.

4. A process according to claim 1 wherein said coating composition contains therein 0.5 to 50 weight percent based on the total weight of the composition of a metal-containing compound selected from at least one of an oxide of cobalt, molybdenum or titanium or a sulfide of cobalt or molybdenum.

5. A process according to claim 1 wherein said coating composition is applied to said substrate as a slurry of same in a liquid suspending agent.

6. A process according to claim 5 wherein said liquid suspending agent is water.

7. The product of the process of claim 1.

8. The product of the process of claim 2.

9. The product of the process of claim 4.